(12) United States Patent
Cantelar

(10) Patent No.: US 12,127,707 B1
(45) Date of Patent: Oct. 29, 2024

(54) TELESCOPIC WOOD-FIRED PIZZA OVEN

(71) Applicant: Eduardo M Cantelar, Miami, FL (US)

(72) Inventor: Eduardo M Cantelar, Miami, FL (US)

( * ) Notice: Subject to any disclaimer, the term of this patent is extended or adjusted under 35 U.S.C. 154(b) by 0 days.

(21) Appl. No.: 18/673,212

(22) Filed: May 23, 2024

(51) Int. Cl.
*A47J 37/06* (2006.01)
*A47J 37/07* (2006.01)
*F24C 1/16* (2021.01)

(52) U.S. Cl.
CPC ....... *A47J 37/0658* (2013.01); *A47J 37/0664* (2013.01); *A47J 37/0704* (2013.01); *A47J 37/0786* (2013.01); *F24C 1/16* (2013.01); *A47J 2037/0777* (2013.01)

(58) Field of Classification Search
CPC ............... A47J 37/0658; A47J 37/0664; A47J 37/0704; A47J 37/0786; A47J 2037/0777; F24C 1/16
See application file for complete search history.

(56) References Cited

U.S. PATENT DOCUMENTS

| | | | | |
|---|---|---|---|---|
| 847,117 | A * | 3/1907 | Salmon | A47J 37/0704 312/107 |
| 6,065,394 | A * | 5/2000 | Gelderman | A47J 37/10 99/449 |
| 2014/0345594 | A1 * | 11/2014 | Rhodes | A47J 37/0704 126/25 R |
| 2016/0227965 | A1 * | 8/2016 | Johnston | A47J 37/0704 |
| 2019/0313851 | A1 * | 10/2019 | Shemp | A47J 37/0718 |
| 2020/0015626 | A1 * | 1/2020 | Corso | A47J 37/0704 |
| 2020/0146505 | A1 * | 5/2020 | Bell | A47J 37/0623 |
| 2022/0167790 | A1 * | 6/2022 | Hipp | A47J 27/13 |

FOREIGN PATENT DOCUMENTS

| | | | |
|---|---|---|---|
| CN | 111878853 A | * | 11/2020 |
| KR | 200395769 Y1 | * | 9/2005 |
| KR | 200495849 Y1 | * | 8/2022 |
| RU | 2646645 C1 | * | 3/2018 |

* cited by examiner

*Primary Examiner* — Jorge A Pereiro
*Assistant Examiner* — Logan P Jones
(74) *Attorney, Agent, or Firm* — Ruben Alcoba, Esq.

(57) ABSTRACT

A telescopic wood-fired pizza oven designed for portability and space efficiency. It consists of a bottom annular ring with an aperture for wood insertion, an inner ledge supporting a circular grill, and a top annular ring with L-shaped receivers to securely lock onto the bottom ring. The top annular ring defines an aperture for pizza insertion with a top door that opens vertically. The top ring also features handles for easy handling and a circular top with a central aperture for ventilation. A folding circular ceramic cooking platform is placed on the grill for optimal pizza cooking. This design allows the oven to collapse into a compact form, making it ideal for storage in recreational vehicles and for transportation to various outdoor settings. The invention provides an authentic wood-fired cooking experience in a portable, easy-to-store format.

8 Claims, 4 Drawing Sheets

$B-B$

TELESCOPIC WOOD-FIRED PIZZA OVEN

TECHNICAL FIELD

The present invention relates to the field of culinary appliances, specifically to portable cooking devices. More particularly, it pertains to a telescopic wood-fired pizza oven designed for efficient use in outdoor and travel environments. This invention addresses the need for compact, collapsible cooking appliances that are easy to transport and store, making it ideal for recreational vehicles, camping, and other mobile settings where traditional large, permanent pizza ovens are impractical.

BACKGROUND

Pizza ovens have been a staple in culinary traditions around the world, known for their ability to cook pizzas at high temperatures, resulting in crispy crusts and perfectly melted toppings. Traditional wood-fired pizza ovens are often large, permanent structures that require significant space and installation effort. However, there is a growing need for portable, efficient, and compact pizza ovens that maintain the authentic wood-fired cooking experience.

This need is particularly pronounced in travel environments, such as recreational vehicles (RVs), where space is at a premium. Travelers and RV owners often face challenges in finding cooking appliances that are easy to store and transport without compromising on functionality. A portable pizza oven that is easy to store in small spaces and simple to ship can significantly enhance the convenience and quality of outdoor cooking experiences.

The telescopic pizza oven meets these needs by providing a collapsible design that saves space when not in use. This feature is especially beneficial in RVs, where every inch of space must be utilized efficiently. The telescopic feature allows the oven to be compactly stored, making it an ideal solution for those who love to cook while on the move. This design ensures that pizza enthusiasts can enjoy authentic wood-fired pizzas without the bulk and permanence of traditional pizza ovens, making it perfect for camping trips, RV adventures, and other mobile lifestyles.

SUMMARY

The present invention is directed to a telescopic wood-fired pizza oven designed for portability and space efficiency. It comprises of a bottom annular ring with an aperture for wood insertion, an inner ledge supporting a circular grill, and a top annular ring with L-shaped receivers to securely lock onto the bottom ring. The top annular ring defines an aperture for pizza insertion with a top door that opens vertically. The top ring also features handles for easy handling and a circular top with a central aperture for ventilation. A folding circular ceramic cooking platform is placed on the grill for optimal pizza cooking. This design allows the oven to collapse into a compact form, making it ideal for storage in recreational vehicles and for transportation to various outdoor settings. The invention provides an authentic wood-fired cooking experience in a portable, easy-to-store format.

An object of the present invention is to provide a pizza oven that is easily transportable, that will allow users to enjoy authentic wood-fired pizza in various outdoor and travel environments, including recreational vehicles, camping sites, and other mobile settings.

Another object of the present invention is to provide a design of a telescopic pizza oven that can be collapsed into a compact form for easy storage.

A further object of the present invention is to provide a user-friendly pizza oven that is simple to assemble and disassemble, that will facilitate a quick setup and a convenient operation, and that will ensure that users can effortlessly enjoy homemade wood-fired pizzas wherever they go.

BRIEF DESCRIPTION OF THE DRAWINGS

These and other features, aspects, and advantages of the present invention will become better understood with regards to the following description, appended claims, and drawings where:

DESCRIPTION

Figure 1:
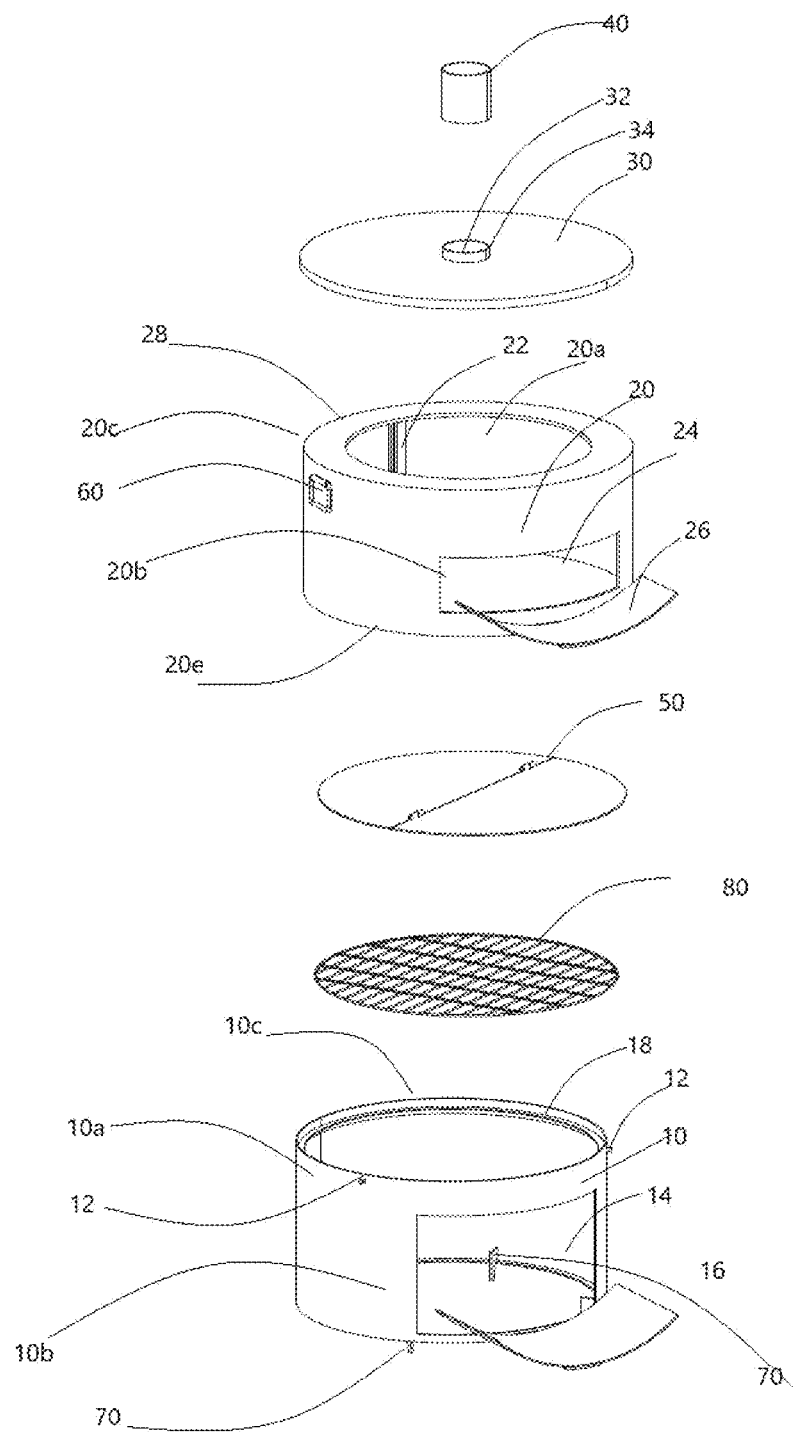
FIG. 1 is an exploded perspective view of the present invention.
Figure 2:
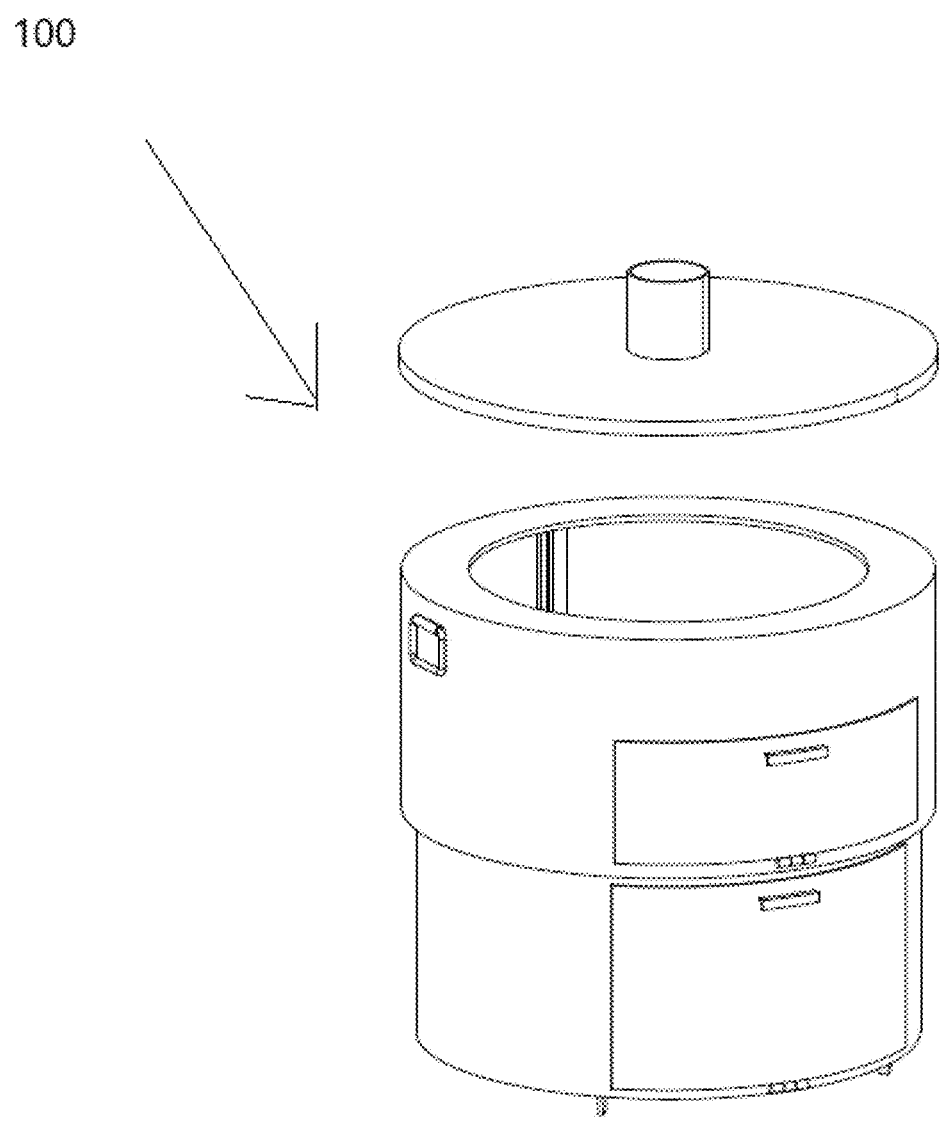
FIG. 2 is a perspective view of the present invention in an expanded position.
Figure 3:
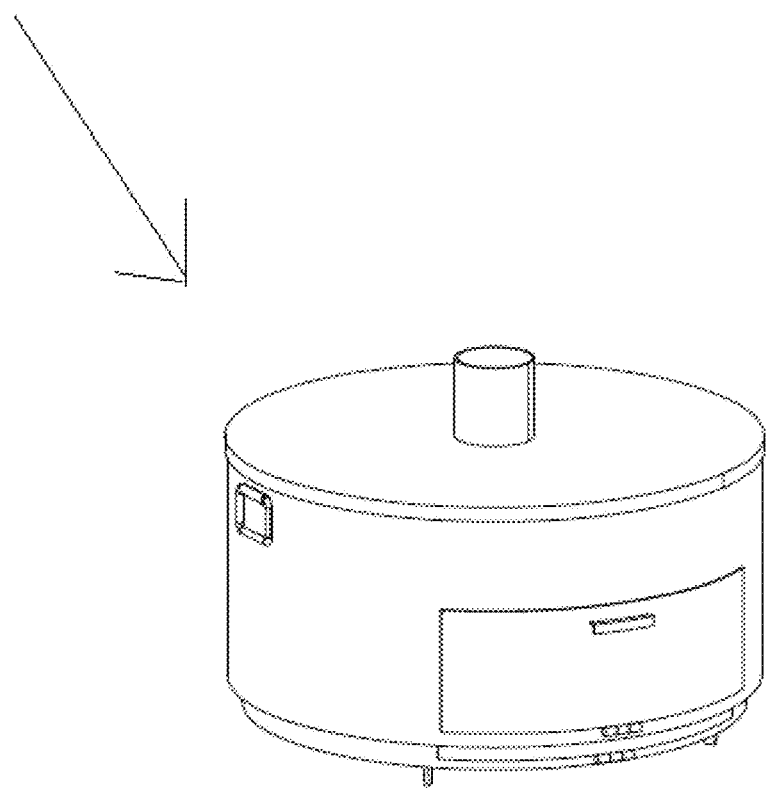
FIG. 3 is a perspective view of the present invention is a collapsed position.
Figure 4:
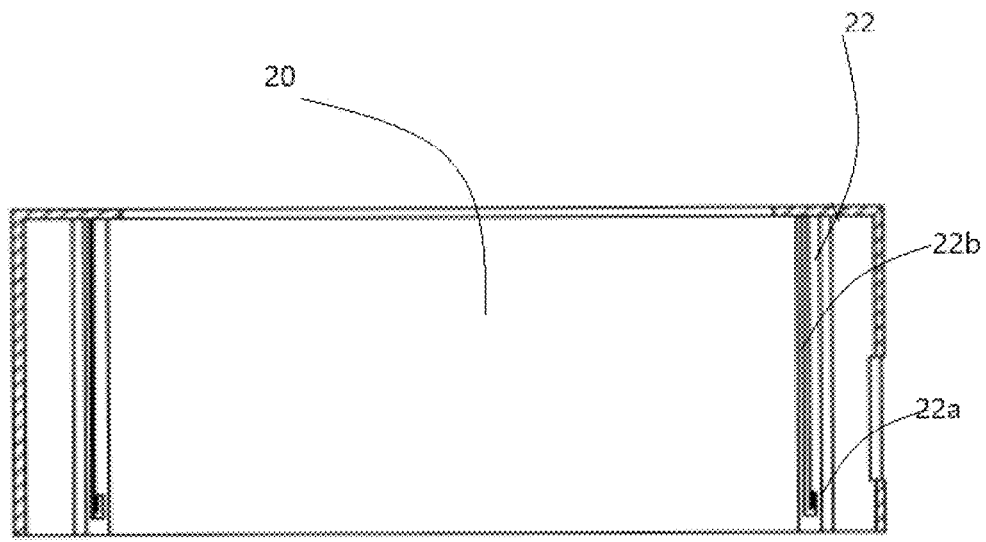
FIG. 4 is a cross sectional view of the top annular ring of the present invention that shows the at least three equally spaced L-shaped receivers.
Figure 4:
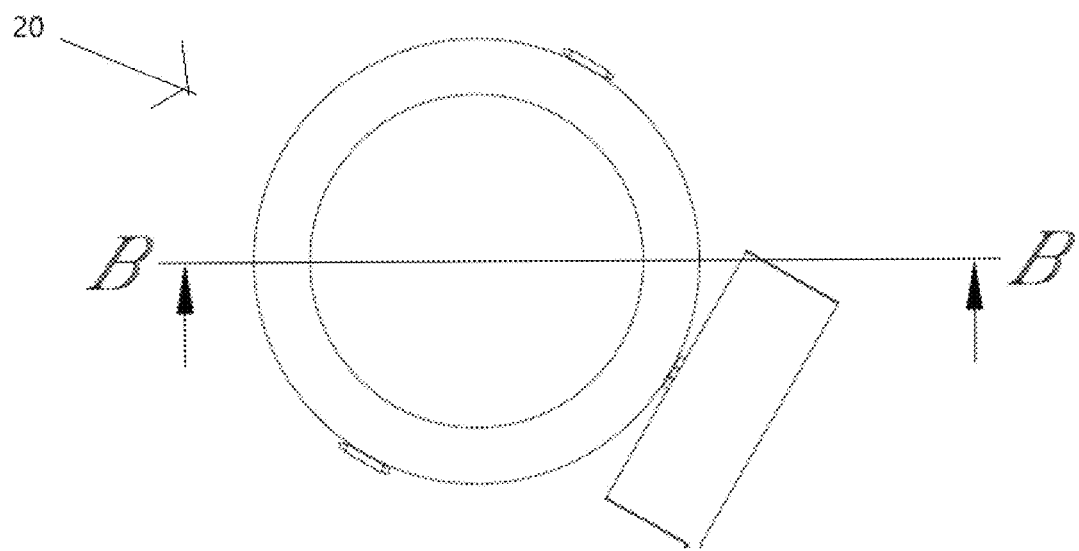

As seen in FIGS. 1-4, the present invention is a telescopic pizza oven 100. The telescopic pizza oven 100 comprises a bottom annular ring 10 that defines at least three equally spaced pins 12 on an upper exterior wall 10a of the bottom annular ring 10, a wood insertion aperture 14 runs across a cross section 10b of the bottom annular ring 10, a bottom door 16 is attached to the bottom annular ring 10 at a location that covers the wood insertion aperture 14. The bottom annular ring 10 defines an inner ledge 18 on an inner top side 10c of the bottom annular ring 10. A circular grill 80 is attached to the inner ledge 18 of the bottom annular ring 10. A top annular ring 20 that has a diameter that is greater than that of the bottom annular ring 10. The top annular ring 20 has at least three equally spaced L-shaped guides 22 that are equally spaced apart and that are defined on an inner wall 20a of the top annular ring 20, the L-Shaped guides 22 are positioned so that a horizontal part 22a of the L-shaped guides 22 run adjacently to the bottom side 20e of the second annular ring 20 and a vertical part 22b of the L-shaped guides 20 runs upward from the bottom section 20e of the second annular ring 20 toward the upper section 20c of the second annular ring 20, the vertical part of the L-Shaped guides 20 do not pass through the upper section 20c of the second annular ring 20, the L-shaped guides 22 extend inward from the inner wall 20a of the top annular ring 20 and the L-shaped guides 22 do not pierce the top annular ring's structure 20, thereby ensuring that no heat or smoke escapes from the top annular ring's 20 side walls through the L-shaped guides 22, the at least three equally spaced pins 12 of the bottom annular ring 10 insert within the at least three equally spaced L-shaped receivers 22 of the top annular ring 20. A food insertion aperture 24 runs across a section 20b of the top annular ring 20, a top door 26 is attached to the top annular ring 20 and the top door 26 covers the food insertion aperture 24. The top annular ring 20 defines a continuous perpendicular ledge 28 that runs inward from an upper section 20c of the top annular ring 20. A circular top 30 attaches to the continuous perpendicular ledge 28, the circular top 30 defines a central aperture 32, a top continuous wall 34 extends outward from the circular top 30 at a location that is adjacent to the central aperture 32.

In an embodiment of the present invention, the telescopic pizza oven comprises of a chimney 40 that mounts on the top continuous wall 34 of the circular top 30.

In another embodiment of the present invention, the telescopic pizza oven comprises of a ceramic cooking platform 80 that folds in half that mounts on the circular grill 80.

In yet another embodiment of the present invention, the telescopic pizza oven comprises of a pair of handles 60 that are equally spaced apart and that are attached to an outer section of the top annular ring 20.

In yet still another embodiment of the present invention, the telescopic pizza oven comprises of a plurality of stabilizers 70 that are attached to a bottom section of the bottom annular ring 10. The plurality of stabilizers 70 are used to secure the telescopic pizza oven on top of a fire pit that has a ledge on its top part.

The embodiments of the telescopic pizza oven described herein are exemplary and numerous modifications, combinations, variations, and rearrangements can be readily envisioned to achieve an equivalent result, all of which are intended to be embraced within the scope of the appended claims. Further, nothing in the above-provided discussions of the telescopic pizza oven should be construed as limiting the invention to an embodiment or a combination of embodiments. The scope of the invention is defined by the description, drawings, and claims.

What is claimed is:

1. A telescopic pizza oven, the telescopic pizza oven comprises:
   a bottom annular ring that defines at least three equally spaced pins on an upper exterior wall of the bottom annular ring, a wood insertion aperture runs across a cross section of the bottom annular ring, a bottom door is attached to the bottom annular ring at a location that covers the wood insertion aperture, the bottom annular ring defines an inner ledge on an inner top side of the bottom annular ring;
   a circular grill is attached to the inner ledge of the bottom annular ring;
   a top annular ring that has a diameter that is greater than that of the bottom annular ring, the top annular ring has at least three equally spaced L-shaped guides that are equally spaced apart and that are defined on an inner wall of the top annular ring, the L-Shaped guides are positioned so that a horizontal part of the L-shaped guides runs adjacently to the bottom side of the second annular ring and a vertical part of the L-shaped guides runs upward from the bottom section of the second annular ring toward the upper section of the second annular ring, the vertical part of the L-Shaped guides do not pass through the upper section of the second annular ring, the L-shaped guides extend inward from the inner wall of the top annular ring and the L-shaped guides do not pierce an outer section of the top annular ring, the at least three equally spaced pins of the bottom annular ring insert within the at least three equally spaced L-shaped receivers of the top annular ring, a food insertion aperture runs across a section of the top annular ring, a top door is attached to the top annular ring and the top door covers the food insertion aperture, the top annular ring defines a continuous perpendicular ledge that runs inward from an upper section of the top annular ring; and
   a circular top attaches to the continuous perpendicular ledge, the circular top defines a central aperture, a top continuous wall extends outward from the circular top at a location that is adjacent to the central aperture.

2. The telescopic pizza oven of claim 1, wherein the telescopic pizza oven comprises a chimney that mounts on the top continuous wall of the circular top.

3. The telescopic pizza oven of claim 2, wherein the telescopic pizza oven comprises a ceramic cooking platform that folds in half that mounts on the circular grill.

4. The telescopic pizza oven of claim 3, wherein the telescopic pizza oven comprises a pair of handles that are equally spaced apart and that are attached to the outer section of the top annular ring.

5. The telescopic pizza oven of claim 4, wherein the telescopic pizza oven comprises a plurality of stabilizers that are attached to a bottom section of the bottom annular ring.

6. The telescopic pizza oven of claim 1, wherein the telescopic pizza oven comprises a ceramic cooking platform that folds in half that mounts on the circular grill.

7. The telescopic pizza oven of claim 1, wherein the telescopic pizza oven comprises a pair of handles that are equally spaced apart and that are attached to an outer section of the top annular ring.

8. The telescopic pizza oven of claim 1, wherein the telescopic pizza oven comprises a plurality of stabilizers that are attached to a bottom section of the bottom annular ring.

\* \* \* \* \*